United States Patent [19]

Hidaka et al.

[11] Patent Number: 4,975,835
[45] Date of Patent: Dec. 4, 1990

[54] VARIABLE LENGTH DATA PROCESSING APPARATUS FOR CONSECUTIVELY PROCESSING VARIABLE-LENGTH DATA RESPONSIVE TO ONE INSTRUCTION

[75] Inventors: Norihiro Hidaka; Shin Ito; Tetsuya Sato; Makoto Kimura, all of Tokyo, Japan

[73] Assignee: Casio Computer Co., Ltd., Tokyo, Japan

[21] Appl. No.: 258,153

[22] Filed: Oct. 14, 1988

[30] Foreign Application Priority Data

Oct. 30, 1987 [JP] Japan .................. 62-274966
Oct. 30, 1987 [JP] Japan .................. 62-166280
Oct. 30, 1987 [JP] Japan .................. 62-166281

[51] Int. Cl.⁵ .............................. G06F 1/00
[52] U.S. Cl. .................. 364/200; 364/245; 364/245.1; 364/259; 364/259.9
[58] Field of Search ... 364/200 MS File, 900 MS File

[56] References Cited

U.S. PATENT DOCUMENTS

| | | |
|---|---|---|
| 3,822,378 | 7/1974 | Kashio . |
| 4,003,031 | 1/1977 | Kashio . |
| 4,031,515 | 6/1977 | Kashio . |
| 4,032,900 | 6/1977 | Kashio . |
| 4,034,350 | 7/1977 | Kashio . |
| 4,064,553 | 12/1977 | Kashio . |
| 4,068,298 | 1/1978 | Dechant et al. ............ 364/200 |
| 4,079,234 | 3/1978 | Kashio . |
| 4,103,334 | 7/1978 | Kashio . |
| 4,133,041 | 1/1979 | Kashio . |
| 4,145,753 | 3/1979 | Kashio . |
| 4,261,033 | 4/1981 | Lemay et al. ............ 364/200 |
| 4,348,725 | 9/1982 | Farrell et al. ............ 364/300 |
| 4,384,343 | 5/1983 | Morganti et al. .......... 364/900 |
| 4,443,860 | 4/1984 | Vidalin ................. 364/900 |
| 4,611,280 | 9/1986 | Linderman .............. 364/300 |

*Primary Examiner*—Raulfe B. Zache
*Attorney, Agent, or Firm*—Frishauf, Holtz, Goodman & Woodward

[57] ABSTRACT

Data divided by delimiters representing the boundaries of the data is stored in a data memory. Instructions each including designation of a delimiter are stored in an instruction register. A control circuit decodes an instruction output from the instruction register, and repeats processing of the data read out from the data memory in accordance with the decoded instruction every time the data is read out therefrom. A delimiter detector outputs a coincidence signal when it detects that a delimiter which coincides with the delimiter in the instruction is present in the data read out from the data memory. When this coincidence signal is input to the control circuit, the control circuit ends the processing which has been performed in accordance with the instruction.

13 Claims, 6 Drawing Sheets

VARIABLE LENGTH DATA PROCESSING APPARATUS FOR CONSECUTIVELY PROCESSING VARIABLE-LENGTH DATA RESPONSIVE TO ONE INSTRUCTION

BACKGROUND OF THE INVENTION

1. Field of the Invention

The present invention relates to an operation apparatus constituting an office computer, a personal computer, or the like.

2. Description of the Related Art

In a conventional central processing unit constituting an office computer or the like, processing such as transfer or an arithmatic operation is performed in a unit of one byte of a fixed length in response to each instruction.

In general, data is input/output in/from a file for each record as a minimum unit. One record consists of a plurality of fields. One field consists of a plurality of bytes. Data in a record is updated for each field as a minimum unit. Therefore, data processing of a file is often performed in units of a plurality of bytes.

The conventional central processing unit, however, can perform processing only in a unit of one byte of a fixed length in response to each instruction. For this reason, in filing, when data processing is performed in units of fields or records, a subroutine consisting of a plurality of instructions must be prepared.

Consequently, a considerably long period of time is required to prepare a program. In addition, the processing speed is decreased.

SUMMARY OF THE INVENTION

It is an object of the present invention to provide an operation apparatus which can process data having an arbitrary length in response to one instruction so as to greatly increase the processing speed.

According to an operation control apparatus of the present invention, in an operation apparatus constituting an office computer or the like, data and delimiters representing data boundaries and weighted priorities for processing are stored in a data storage. When data sequentially read out from the data storage are processed in accordance with an instruction, a delimiter designated in correspondence with the instruction is compared with a delimiter read out from the data storage. When the readout delimiter coincides with the designation delimiter, the processing corresponding to the instruction is completed.

According to the present invention, processing such as transfer or an arithmetic operation of data having an arbitrary length defined by delimiters can be performed by using one instruction. Therefore, the processing speed of data is increased and the preparation of a program for data processing can be facilitated.

DETAILED DESCRIPTION OF THE PREFERRED EMBODIMENTS

Figure 1:
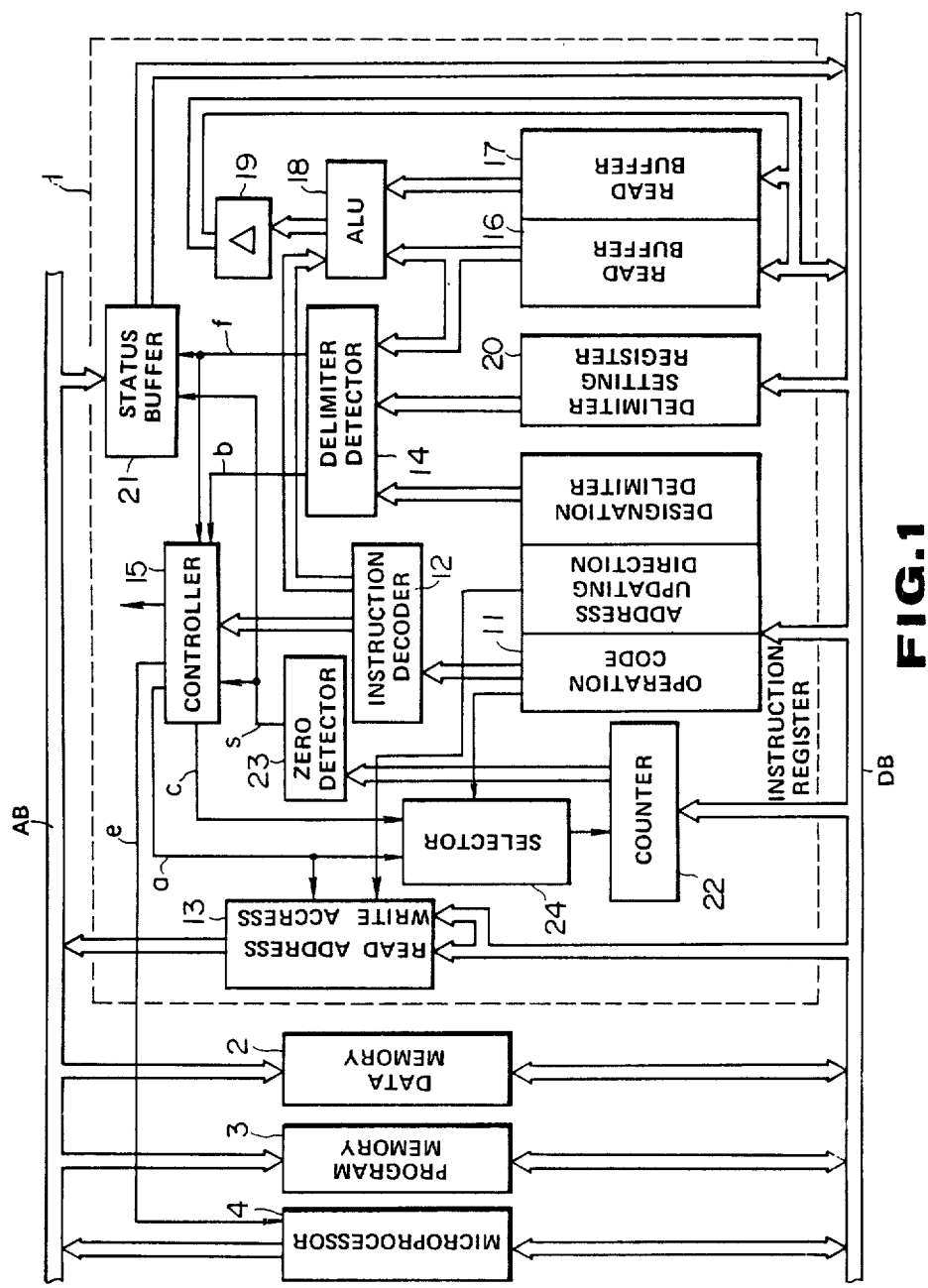
FIG. 1 is a block diagram showing an overall arrangement of a data processing apparatus comprising operation apparatus 1.

FIG. 1 shows an overall arrangement of a data processing apparatus. Referring to FIG. 1. Operation apparatus 1 performs transfer, comparison, arithmetic operations, and the like of variable-length data. Data memory 2 stores variable-length data. The variable-length data is divided by delimiters which are codes representing boundaries of the data. Program memory 3 stores instructions to be supplied to operation apparatus 1. Microprocessor 4 sets an instruction stored in program memory 3 in operation apparatus 1, controls input/output units (not shown), and exchanges data with these input/output units. Operation apparatus 1, data memory 2, program memory 3, and microprocessor 4 are connected to each other through common address and data buses AB and DB.

In operation apparatus 1, instruction register 11 is a register for storing instructions read out from program memory 3 connected thereto through address and data buses AB and DB. Operation codes, address updating directions, and designation delimiters stored in instruction register 11 are respectively supplied to instruction decoder 12, address generator 13, and delimiter detector 14.

Instruction decoder 12 decodes an input operation code, and supplies an output signal based on the decoded result to control circuit 15 and ALU 18. Control circuit 15 outputs various control signals required for executing instructions decoded by instruction decoder 12, and supplies control signal a to address generator 13 and counter 22 for each execution cycle.

In response to control signal a output from control circuit 15, address generator 13 increments or decrements read and write addresses every execution cycle in accordance with an address updating direction from instruction register 11. Addresses generated by this operation are supplied to data memory 2 through address bus AB. When data designated by the read address from address generator 13 is read out from data memory 2, the readout data is stored in read buffer 16 through data bus DB. When data designated by the write address from address generator 13 is read out from data memory 2, the readout data is stored in read buffer 17 through data bus DB. If an operation code stored in instruction register 11 is an instruction used for an arithmetic operation of operand data and operator data, e.g., an arithmetic and logic operation instruction, the operand and operator data are respectively stored in read buffers 16 and 17. In this case, the operand and operator data in read buffers 16 and 17 are supplied to ALU (Arithmetic and Logic Unit) 18. ALU 18 performs an operation in accordance with an operation instruction from instruction decoder 12. After the operation result is stored in data bus buffer 19, it is supplied to data memory 2 through data bus DB and then is written in an address area designated by the write address from address generator 13. When an instruction designated by the operation code in instruction register 11 is a transfer instruction, data designated by the read address from address generator 13 is read out from data memory 2, and is set in read buffer 16. When the write address is output from address generator 13, and data set in read buffer 16 is supplied to data memory 2 through ALU 18 and data bus buffer 19, the data is written in an address area designated by the write address.

Delimiter detector 14 compares a designation delimiter stored in instruction register 11 or a designation delimiter prestored in delimiter setting register 20 with data (delimiter) set in read buffer 16. If both the delimiters coincide with each other delimiter detector 14 outputs detection signal b to control circuit 15. If a delimiter having a higher priority than the designation delimiter is detected, delimiter detector 14 outputs detection signal f to control circuit 15 and status buffer 21. Control circuit 15 outputs control signal c to counter 22 through selector 24 every time detection signal b is supplied from delimiter detector 14. Counter 22 is constituted by a subtraction counter. An arbitrary value can be set in counter 22 in advance, and the set value is decremented by one every time control signal c or a is supplied from control circuit 15. Subsequently, the count value of counter 22 is supplied to zero detector 23. Zero detector 23 detects whether the value becomes "0" or not. If "0" is detected by zero detector 23, zero detection signal s is supplied to control circuit 15 and status buffer 21. When control circuit 15 receives zero detection signal s from zero detector 23 or detection signal f from delimiter detector 14, it stops output of a control signal used for executing an instruction, and outputs end signal e to microprocessor 4 to designate a next instruction to be read out from program memory 3.

Delimiters to be processed in the embodiment will be described below. The delimiters represents boundaries of data in data memory 2 and their weighted priorities for processing. The following four types of delimiters are used in this embodiment:

☐ : track end
( : record start
9N: word end (numerical value)
9: word end (character)

Each delimiter is represented by a hexadecimal code consisting of one byte. The track end, the record start, the word end for a numerical value, and the word end for a character respectively correspond to "FF", "FE", "FD", and "00". In addition to these fixed delimiters of four types, an arbitrary delimiter can be set in delimiter setting register 20 in the embodiment. Thus, five types of delimiters including this arbitrary delimiter are used.

The following priorities are assigned to the five types of delimiters. The first through fourth priorities are respectively assigned to the track end delimiter, the record start delimiter, the two types of word end delimiters, and the set delimiter in delimiter setting register 20 in the order named as fixed priorities. Note that the word end delimiter for a numerical value and the word end delimiter for a character have the sam priority.

The code set by the set delimiter in instruction register 11 is represented by a binary code consisting of two bits. "11", "10", "01", and "00" respectively represent a track end, a record start, a word end (for a numerical value), and a word end (for a character). These codes correspond to delimiters "FF", "FE", "FD", and "00" which are represented by hexadecimal codes each consisting of one byte and represent boundaries of data in the data memory.

Figure 2:
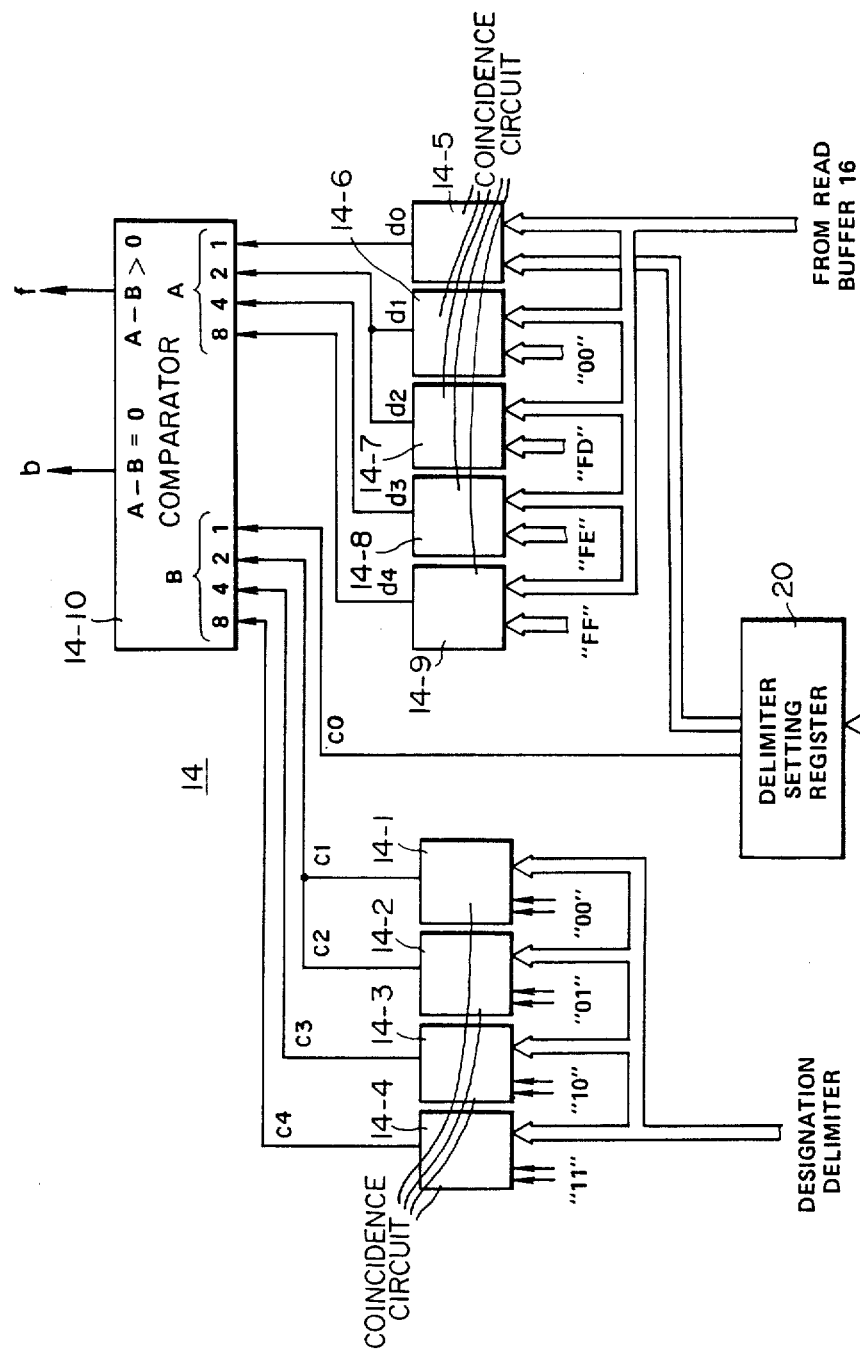
FIG. 2 is a block diagram showing a detailed arrangement of delimiter detector 14.

As shown in FIG. 2, delimiter detector 14 comprises four coincidence circuits 14-1 through 14-4 for receiving designation delimiters from instruction register 11, and five coincidence circuits 14-5 through 14-9 for receiving read delimiters from read buffer 16. Four coincidence circuits 14-1 through 14-4 respectively receive corresponding fixed delimiters "00" through "11". Each fixed delimiter is represented by a binary code consisting of two bits. When each of coincidence circuits 14-1 through 14-4 detects coincidence between one of the fixed delimiters and a designation delimiter (a designated code of binary codes "00", "01", "10", and "11") from instruction register 11, it outputs one of coincidence signals c1 through c4 and supplies the signal to comparator 14-10. In this case, coincidence circuits 14-1 and 14-2 are wired-OR. When an arbitrary delimiter is set in delimiter setting register 20, set presence signal c0 output from delimiter setting register 20 is input to comparator 14-10 together with the outputs from coincidence circuits 14-1 through 14-4 as data B constituted by four bits. Weights of "1", "2", "4", and "8" are assigned to the respective bit positions of four-bit data B in correspondence with their priorities. Set presence signal c0, signal c1 or c2, signal c3, and signal c4 correspond to weights of "1", "2", "4", and "8", respectively.

A coincidence detecting code represented by a hexadecimal code consisting of one byte is supplied to the other terminal of each of five coincidence circuits 14-5 through 14-9 to which the read delimiters from read buffer 16 are input. More specifically, a set delimiter code in delimiter setting register 20 is input to coincidence circuit 14-5, code "00" representing a word end for a character is input to coincidence circuit 14-6, code "FD" representing a word end for a numerical value is input to coincidence circuit 14-7, code "FE" representing a record start is input to coincidence circuit 14-8, and code "FF" representing a track end is input to coincidence circuit 14-9. When coincidence circuits 14-5 through 14-9 detect coincidence between the read delimiters and the coincidence detecting codes, they output coincidence signals d0, d1, . . . d4 to comparator 14-10. In this case, coincidence circuits 14-6 and 14-7 are wired-OR. Therefore, the outputs from coincidence circuits 14-5 through 14-9 are supplied to comparator 14-10 as four-bit data A. Weights of "1", "2", "4", and "8" are assigned to the respective bit positions of four-bit data A in correspondence with their priorities. Coincidence signals d0, d1 or d2, d3, and d4 respectively correspond to weights of "1", "2", "4", and "8".

Comparator 14-10 compares data A with data B. If $A-B=0$, comparator 14-10 outputs detection signal b. If $A-B>0$, it outputs detection signal f.

Operation I

A case wherein variable-length data having an arbitrary length and stored in data memory 2 at a predetermined address position as its start position is transferred by a unit defined by a delimiter will be described below. This transfer can be performed by designating one instruction. A transfer operation by this instruction will be described below.

A large number of instructions are stored in program memory 3, and are sequentially read out by microprocessor 4 to be set in operation apparatus 1, thereby operating operation apparatus 1. Each instruction is constituted by an operation code, an address updating direction, a designation delimiter, the initial value of a read address, the initial value of a write address, and the like. The operation code, the address updating direction, and the designation delimiter are set in instruction register 11, whereas the initial values of the respective addresses are set in address generator 13. In this embodiment, since a count value is not set in counter 22, counter 22 and zero detector 23 are not operated, and zero detection signal s is not output from zero detector 23.

As shown in FIG. 3, data d (each represented by a hexadecimal code consisting of one byte) stored in data memory 2 are divided into predetermined units by various delimiters (for a character word end, a record start, and a track end). In the following description, an operation code set in instruction register 11 is a transfer instruction.

In this case, data read out from data memory 2 by a read address from address generator 13 is set in read buffer 16. Then, a write address is output from address generator 13, and the data in read buffer 16 is read out and written in a designated address area of data memory 2. In this case, the data in read buffer 16 is also supplied to delimiter detector 14. If the data is not a delimiter, detection signal b or f is not output from delimiter detector 14. Consequently, control circuit 15 outputs a control signal for executing the transfer instruction every execution cycle, and updates each address in address generator 13 by control signal a, thereby causing the next data in data memory 2 to be set in read buffer 16. While a delimiter read out from data memory 2 is set in read buffer 16 during the execution of such data transfer, delimiter detector 14 compares a designation delimiter from instruction register 11 or a set delimiter from delimiter setting register 20 with the delimiter set in read buffer 16. If the delimiter set in read buffer 16 has a priority equivalent or higher to/than that of the designation delimiter or set delimiter, detection signal f or b is output.

Figure 3A:
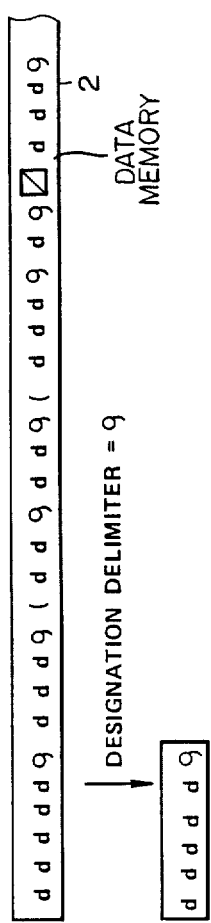
FIGS. 3A through 3C are views showing data stored in data memory 2 and processed by one instruction in a case wherein data defined by designation delimiters is processed as a unit.

Assume that the designation delimiter in instruction register 11 is delimiter "00" corresponding to character word end delimiter "9", and identical delimiter "9" is set in read buffer 16. In this case, since coincidence circuits 14-1 and 14-6 output coincidence signals c1 and d1, respectively in delimiter detector 14, both data A and B become "2". As a result, detection signal b is output from comparator 14-10. When detection signal b is supplied to control circuit 15, it ends execution of the transfer instruction and outputs end signal e. With this operation, the next instruction is set in instruction register 11 and address generator 13. As described above, if a designation delimiter is of a character word end, execution of a transfer instruction is completed when the delimiter is first read out from data memory 2 and set in read buffer 16, as shown in FIG. 3A. Therefore, data transfer is performed in a unit defined by this delimiter. When delimiter "(" or "㌘" having a higher priority than delimiter "9" is read in read buffer 16, comparator 14-10 outputs detection signal f, and execution of the transfer instruction is ended.

Figure 3B:
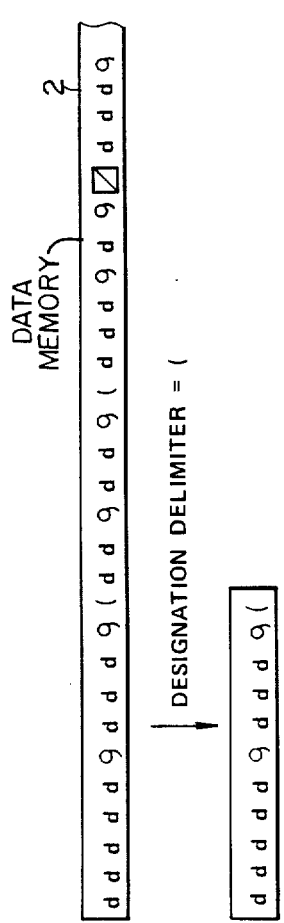

When a designation delimiter in instruction register 11 is delimiter "10" corresponding to record start delimiter "(", coincidence circuits 14-3 and 14-6 output coincidence signals c3 and d1 in delimiter detector 14 even if delimiter "㌘" for a character word end is read out from data memory 2. As a result, data A and B become "2" and "4", respectively. That is, since the delimiter set in read buffer 16 has a lower priority than the designation delimiter, neither detection signal b nor f is output from comparator 14-10. Consequently, the data transfer processing is repeatedly executed. When delimiter "(" representing the first record start is read out from data memory 2 and is set in read buffer 16, coincidence circuits 14-3 and 14-8 output coincidence signals c3 and d3. As a result, both data A and B become "4", and detection signal b is output from comparator 14-10. Therefore, if a designation delimiter is of a record start, execution of the transfer instruction is ended when a delimiter representing a record start is first read out from data memory 2, as shown in FIG. 3B, so that data transfer is performed in a unit of a data length defined by this delimiter. In addition, when delimiter "㌘" having a higher priority than delimiter "(" is read in read buffer 16, execution of the transfer instruction is ended.

Figure 3C:
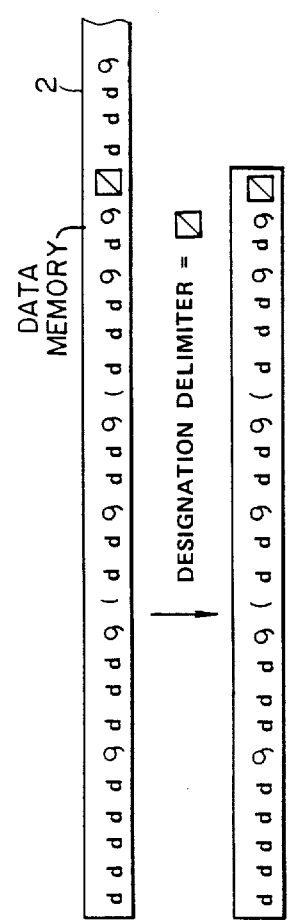

Similarly, when a designation delimiter in instruction register 11 is delimiter "11" corresponding to track end delimiter "㌘" and delimiter "㌘" is read out from data memory 2, coincidence circuits 14-4 and 14-9 output coincidence signals c4 and d4 in delimiter detector 14. As a result, both data A and B become "8", and detection signal b is output from comparator 14. Therefore, as shown in FIG. 3C, data transfer is performed in a unit of a length defined by the track end delimiter.

If any one of the four types of fixed delimiters is designated so as to correspond to an instruction in instruction register 11 in this manner, data transfer can be performed in a unit of an arbitrary data length by using one instruction, e.g., a transfer instruction.

When an arbitrary delimiter is set in delimiter setting register 20 by using an arbitrary code, the number of types of delimiters can be increased to five types including the fixed delimiters. Furthermore, since the set delimiter has the lowest priority, data divided by a word end delimiter can be further divided into a plurality of blocks. Thus, data transfer can be performed in units of blocks.

Since the word end delimiters are classified into the one for a numerical value and the one for a character and the same priority is assigned to them, the type of data can be determined by only determining the type of a delimiter code. In addition, even if data including the numerical value and character delimiters is to be processed, since the same priority is assigned, the data can be processed as the same unit of processing.

When an instruction such as an operation instruction or a logic instruction is to be processed, an operation based on operator and operand data stored at contiguous addresses in the data memory is performed. In this case, processing is also performed in units of delimiters in the same manner as in data transfer.

Figure 4:
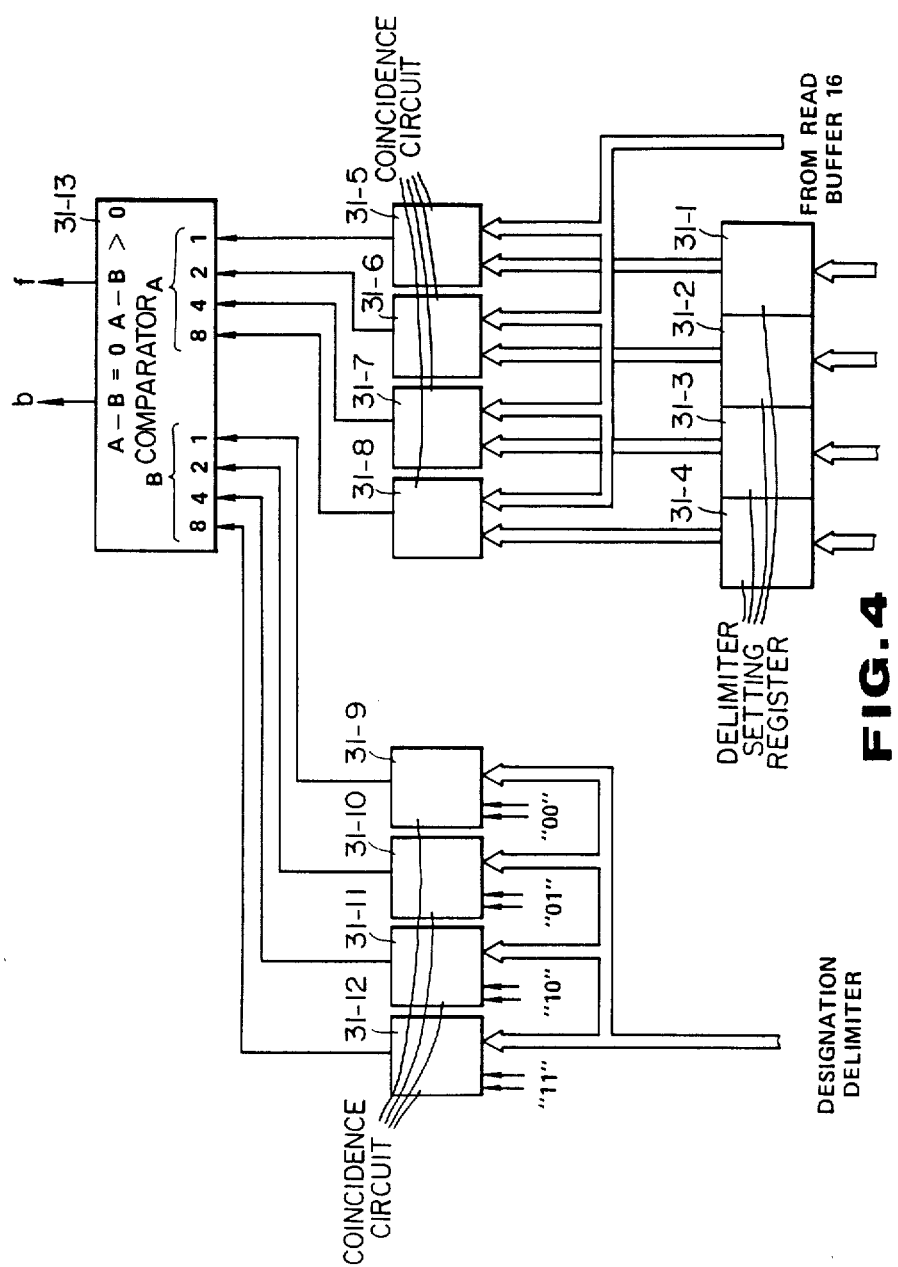
FIG. 4 is a block diagram showing another arrangement of delimiter detector 31.

FIG. 4 shows an arrangement of delimiter detector 31 according to another embodiment. According to this delimiter detector, four types of delimiters can be set by using arbitrary codes and priorities can be arbitrarily assigned to them. More specifically, the four types of delimiters are respectively set in delimiter setting registers 31-1 through 31-4. The set delimiters are supplied to corresponding coincidence circuits 31-5 through 31-8. When coincidence circuits 31-5 through 31-8 detect coincidence between delimiters from read buffer 16 (FIG. 2) and the set delimiters, they output coincidence signals to comparator 31-13. Weights of "1", "2", "4", and "8" are assigned to the respective bit positions of four-bit data A in correspondence with their priorities.

The outputs from coincidence circuits 31-5 through 31-8 respectively correspond "1" ... "8".

Designation delimiters "00" through "11" are supplied from instruction register 11 in FIG. 1 to coincidence circuits 31-9 through 31-12 in the same manner as in the first embodiment. In this embodiment, however, weights of "1", "2", "4", and "8" are respectively assigned to the respective bit positions of four-bit data B from coincidence circuits 31-9 through 31-12. The outputs from coincidence circuits 31-9 through 31-12 respectively correspond to "1" through "8" and are supplied to comparator 31-13. Similar to the above-described embodiment, comparator 31-13 compares data A and B, and outputs detection signal b when $A-B=0$ and detection signal f when $A-B>0$.

With this arrangement, four types of delimiters can be set by using arbitrary codes and their priorities can be arbitrarily set.

Note that the same code may be or may not be used for a designation delimiter in an instruction and a delimiter in data. When the same code is not used, the code of the designation delimiter is made to correspond to the code of the delimiter used in data in advance, so that detection of both the delimiters is performed based on the correspondence therebetween when delimiter detector 14 performs detection.

Operation II

An operation wherein variable-length data is transferred by an arbitrary number of units each defined by a delimiter by using one instruction will be described below.

The contents of an instruction in this case include the number of units of the variable-length data in addition to the contents of the instruction in above-described operation I. The number of units is set in counter 22 when microprocessor 4 sets an instruction.

Figure 5A:
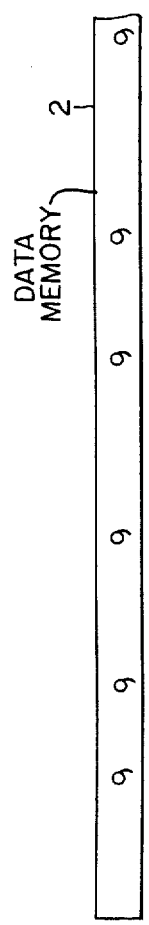
FIGS. 5A through 5C are views showing data in stored data memory 2 and processed by one instruction in a case wherein blocks of data defined by designation delimiters are processed as a unit.
Figure 5B:
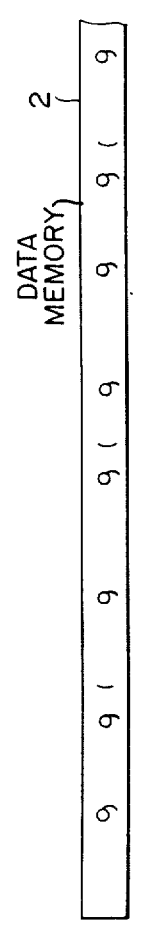

Assume that an operation code in instruction register 11 is a transfer instruction for designating the number of units, a designation delimiter is a delimiter representing character word end "9", and the same delimiter is read in read buffer 16. In this case, delimiter detector 14 outputs detection signal b to control circuit 15. Since control circuit 15 outputs decrement signal c, the value of counter 22 is decremented by one and becomes "2". In this case, therefore, zero detection signal s is not output from zero detector 23. Note that selector 24 outputs decrement signal c if the operation code is a transfer instruction for designating the number of units. Control circuit 15 outputs a control signal again to cause the transfer instruction to be executed again. When a second delimiter (character word end delimiter) is read out from data memory 2, detection signal b is output from delimiter detector 14 again. As a result, the value of counter 22 becomes "1". Since no zero detection signal is output from zero detector 23 in this case too, the transfer instruction is executed again. When a third delimiter (character word end delimiter) is read out from data memory 2 in this manner, the value of counter 22 becomes "0". As a result, control circuit 15 ends the currently executed transfer instruction in response to zero detection signal s from zero detector 23, and outputs end signal e. With this operation, the next instruction read out from program memory 3 is set in instruction register 11, address generator 13, and counter 22. As described above, if the designation delimiter is a character word end delimiter, when the delimiter is read out from data memory 2 three times, execution of the transfer instruction is ended. Therefore, data transfer is performed in a unit of a data length defined by the third delimiter When the designation delimiter in instruction register 11 is a record start delimiter, even if a character word end delimiter is read out from data memory 2, since the priority of the delimiter set in read buffer 16 is lower than that of the designation delimiter, neither of detection signals b and f is output from delimiter detector 14, and initial value "3" of counter 22 is kept unchanged. Subsequently, detection signal b is output from delimiter detector 14 and the value of counter 22 is decremented by one every time the record start delimiter is read out from data memory 2. When the record start delimiter is read out from data memory 2 three times, the value of counter 22 becomes "0". As a result, execution of the transfer instruction is ended at this time, and data transfer is performed in a unit of a data length defined by the third delimiter, as shown in FIG. 5B.

Figure 5C:
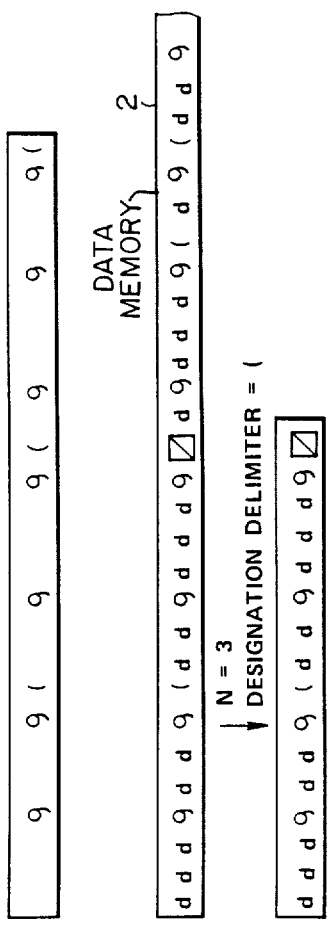

In this case, if a delimiter representing a record start and having a priority higher than the third delimiter representing a record start is read out from data memory 2 as shown in FIG. 5C, detection signal f is output from delimiter detector 14 to control circuit 15 and status buffer 21. As a result, execution of the transfer instruction is ended at this time regardless of the value of counter 22. Therefore, data transmission is performed in a unit of a data length defined by this record start delimiter.

Note that status buffer 21 stores as data a status representing whether execution of an instruction is ended upon detection of "0" by zero detector 23 or by detection signal f from delimiter detector 14 upon detection of a delimiter having a high priority. This data is read out through data bus DB by an access from microprocessor 4.

If any one of the four types of delimiters is designated in correspondence with an instruction in instruction register 11, and an arbitrary value is set in counter 22, data transfer can be performed in a unit of an arbitrary data length by using one instruction.

When an arbitrary delimiter is set in delimiter register 20 by using an arbitrary code, the number of types of delimiters can be increased to five types including the fixed delimiters. In addition, since the set delimiter has lowest priority, data divided by word end delimiters can be further divided into a plurality of blocks, and data transfer can be performed in units of blocks.

According to this embodiment, since a delimiter representing the end of execution of an instruction is arranged in the instruction, and execution of the instruction is repeated until the delimiter is detected in readout data, transfer or an arithmetic operation of data having an arbitrary length defined by a delimiter can be performed by one instruction. Therefore, the processing speed of data can be increased, and the preparation of a program for data processing can be facilitated. In addition, since a plurality of blocks defined by identical delimiters can be processed until the value of a counter means is set to a specific value, the processing speed is increased, and the block range of data can be arbitrarily designated.

Operation III

An operation wherein when variable-length data is transferred in a unit defined by a delimiter, the maximum value of the length of data to be transferred is designated will be described.

In this case, the contents of an instruction include the maximum value of the length of the variable-length data in addition to the contents of the instruction in Operation I. This maximum value is represented by the number of bytes, and is set in counter 22 when microprocessor 4 sets an instruction.

Note that the maximum value is designated so as to prevent adverse effects due to a program or hardware error, e.g., a transfer instruction or the like is undesirably continued and data in data memory 2 is destroyed. In processing of a transfer instruction, the maximum value of the number of bytes of data defined by a delimiter is designated.

Assume that an operation code in instruction register 11 is a transfer instruction including maximum value designation, and "20" is set in counter 22 as the maximum value.

First-byte data is read out from data memory 2 by a read address from address generator 13 and is set in read buffer 16. Then, a write address is output from address generator 13, and the data in read buffer 16 is read out and written in a designated address area in data memory 2. Although in this case the value of counter 22 is decremented to "19", zero detection signal s is not output from zero detector 23. Note that selector 24 outputs control signal a if the operation code is a transfer instruction including maximum value designation. Since the first-byte data set in read buffer 16 is not a delimiter, neither coincidence signal b nor f is output from delimiter detector 14. Control circuit 15 outputs a control signal again so as to cause the transfer instruction to be executed, provided that neither of zero detection signal s and coincidence signal b or f is output. Thus, each address of address generator 13 is updated by control signal a, and the next data in data memory 2 is set in read buffer 16.

Assume that when a fourth byte delimiter is read out and is set in read buffer 16 in this manner, a designation delimiter in instruction register 11 is a delimiter representing a record start. In this case, even if a word end delimiter is set in read buffer 16, neither of coincidence signals b and f is output, and moreover, zero detection signal s is not output because the value of counter 22 at this time is "16".

When 14th-byte data is read out and is set in read buffer 16, since this data is a delimiter representing a record start and coincides with the designation delimiter, coincidence detection signal b is output. In response to signal b, control circuit 15 ends execution of the transfer instruction, and outputs end signal e. When the designation delimiter is a delimiter representing a record start as in this case, if this delimiter is read out before the value of counter 22 becomes "0", i.e., before data of 20 bytes is read out, execution of the transfer instruction is ended.

Note that status buffer 21 stores as data a status representing whether processing of an instruction is ended by zero detection signal s from zero detector 23 or coincidence signal f from delimiter detector 14. This data is read out through data bus DB by an access from microprocessor 4.

Figure 6A:
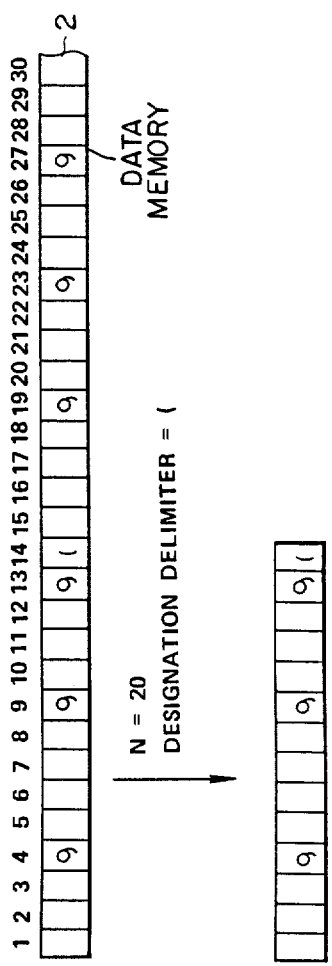
FIGS. 6A and 6B are views showing data stored in data memory 2 and processed by one instruction in a case wherein data defined by designation delimiters is processed as a unit and the maximum value of the data length is designated.

As shown in FIG. 6A, therefore, data transfer can be performed in a unit of data length of 14 bytes defined by the delimiter representing a record start.

Figure 6B:
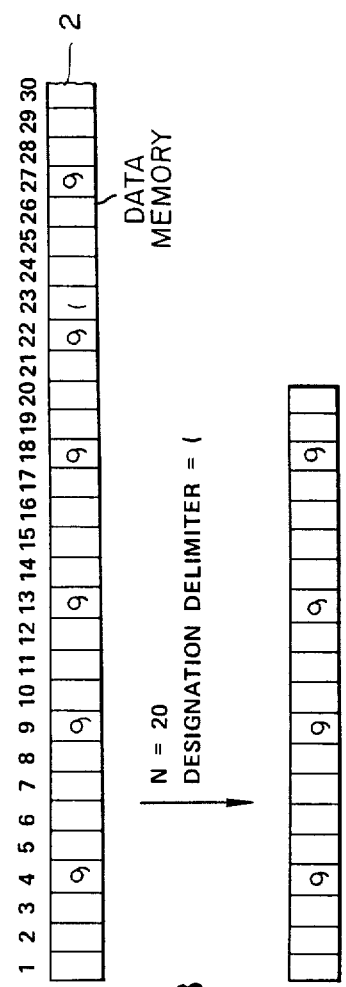

In contrast to this, when a delimiter which coincides with the designation delimiter is not set in read buffer 16 after 20-byte data is read out, as shown in FIG. 6(B), data transfer is ended at this moment because the value of counter 22 becomes "0" and zero detection signal s is output. Therefore, in this case, data transfer is performed in a unit of a data length of 20 bytes.

If a delimiter is set in delimiter setting register 20 by using an arbitrary code, when delimiter detector 14 detects coincidence between the set delimiter and a delimiter set in read buffer 16, it outputs coincidence detection signal b or f. Therefore, data transfer is ended at this time. This operation is the same as that of the above-described designation delimiter.

Furthermore, if the operation code is an operation instruction or a logic instruction, an operation based on operator and operand data stored at continuous addresses in data memory 2 is performed. In this case, too, processing is performed in units of delimiters in the same as in data transfer.

Note that the same code may be or may not be used for a designation delimiter in an instruction and a delimiter in data. When the same code is not used, the code of the designation delimiter is made to correspond to the code of the delimiter used in data in advance, so that detection of both the delimiters is performed on the correspondence therebetween when delimiter detector 14 performs detection.

According to this embodiment, since a delimiter designating the end of execution of an instruction is arranged in the instruction, and execution of the instruction is repeated until the delimiter is detected in readout data, transfer or an arithmetic operation of data having an arbitrary length defined by a delimiter can be performed by one instruction. Therefore, the processing speed of data can be increased and the preparation of a program for data processing can be facilitated. In addition, since execution of an operation by the instruction is ended when the value of a counter means reaches a specific value, an erroneous operation due to a program or hardware error can be reliably prevented.

What is claimed is:

1. An apparatus for consecutively processing variable-length data by one instruction, comprising:

data storage means for storing a plurality of variable length data each divided by a delimiter;

instruction storage means for storing a plurality of instructions which include designation of a delimiter;

means for reading out an instruction from said instruction storage means;

address generating means coupled to said data storage means, for consecutively outputting addresses to said data storage means;

data processing means coupled to said instruction storage means and to said data storage means, for decoding one of the instructions read out from said instruction storage means which designates a delimiter, and for consecutively processing variable-length data in accordance with said one decoded instruction, the variable-length data being consecutively read out from said data storage means by using the addresses output from said address generating means;

delimiter detecting means coupled to said data storage means and to said instruction storage means, for outputting a coincidence signal upon detecting that a delimiter from said data storage means which coincides with a delimiter designated by said one decoded instruction is present in said consecutively read out data; and control means coupled to said delimiter detecting means, and responsive to the coincidence signal from said delimiter detecting means, for ending said consecutive processing of variable-length data performed in accordance with said one decoded instruction.

2. The apparatus according to claim 1, wherein the designation of a delimiter includes at least one of delimiter data and data corresponding to a delimiter.

3. The apparatus according to claim 2, wherein the delimiter data include a delimiter per se.

4. The apparatus according to claim 1, wherein:
the delimiter in said data storage means includes a plurality of codes to which weighted priorities for processing are assigned; and
said delimiter detecting means includes means for outputting the coincidence signal to said control means upon detecting that a delimiter read out from said data storage means has a higher priority than the delimiter designated by said one decoded instruction.

5. An apparatus for consecutively processing variable length data by one instruction, comprising:
data storage means for storing a plurality of variable length data each divided by a delimiter;
instruction storage means for storing a plurality of instructions which include designation of a delimiter;
means for reading out an instruction from said instruction storage means;
address generating means coupled to said data storage means, for consecutively outputting addresses to said data storage means;
data processing means coupled to said instruction storage means and to said data storage means, for decoding one of the instructions read out from said instruction storage means which designates a delimiter, and for consecutively processing variable-length data in accordance with said one decoded instruction, the variable-length data being consecutively read out from said data storage means by using the addresses output from said address generating means;
delimiter detecting means coupled to said data storage means and to said instruction storage means, for outputting a coincidence signal upon detecting that a delimiter from said data storage means which coincides with a delimiter designated by said one decoded instruction is present in said consecutively read out data;
counting means coupled to said delimiter detecting means, for counting coincidence signals output from said delimiter detecting means; and
control means coupled to said counting means, for ending said consecutive processing of variable-length data performed in accordance with said one instruction in response to a count value of said counting means reaching a specific value.

6. The apparatus according to claim 5, wherein:
the delimiter in said data storage means includes a plurality of codes to which weighted priorities for processing are assigned;
said delimiter detecting means includes means for outputting a specific detection signal to said control means upon detecting that a delimiter read out from said data storage means has a higher priority than the delimiter designated by said one decoded instruction; and
said control means includes means for ending said consecutive processing of said variable-length data which is performed in accordance with the one decoded instruction when said specific detection signal is input to said control means.

7. The apparatus according to claim 5, wherein the designation of a delimiter includes at least one of delimiter data and data corresponding to a delimiter.

8. The apparatus according to claim 7, wherein the delimiter data includes a delimiter per se.

9. An apparatus for consecutively processing variable length data by one instruction, comprising:
data storage means for storing a plurality of variable length data each divided by a delimiter;
instruction storage means for storing a plurality of instructions which include designation of a delimiter;
means for reading out an instruction from said instruction storage means;
address generating means coupled to said data storage means, for consecutively outputting addresses to said data storage means;
data processing means coupled to said instruction storage means and to said data storage means, for decoding one of the instructions read out from said instruction storage means which designates a delimiter, and for consecutively processing variable-length data in accordance with said one decoded instruction, the variable-length data being consecutively read out from said data storage means by using the addresses output from said address generating means;
delimiter detecting means coupled to said data storage means and to said instruction storage means, for outputting a coincidence signal upon detecting that a delimiter from said data storage means which coincides with a delimiter designated by said one decoded instruction is present in said consecutively read out data; and
counting means coupled to said data processing means, for counting a number of data items read out from said data storage means;
control means coupled to said delimiter detecting means and to said counting means, for ending said consecutive processing of variable data performed in accordance with said one decoded instruction in response to the coincidence signal from said delimiter detecting means or a count value of said counting means reaching a specific value.

10. The apparatus according to claim 9, wherein:
the delimiter in said data storage means includes a plurality of codes to which weighted priorities for processing are assigned; and
said delimiter detecting means includes means for outputting the coincidence signal to said control means upon detecting that a delimiter read out from said data storage means has a higher priority than the delimiter designated by said one decoded instruction.

11. The apparatus according to claim 9, wherein the designation of a delimiter includes at least one of delimiter data and data corresponding to a delimiter.

12. The apparatus according to claim 11, wherein the delimiter data includes a delimiter per se.

13. A processor for consecutively processing variable length data in accordance with one instruction, the length of the variable-length data being defined by at least one delimiter, comprising:

instruction storage means for storing one instruction including an operation portion designating an operation to be performed by the variable-length data and a delimiter portion designating a delimiter;

address generating means for sequentially outputting addresses to obtain said variable-length data;

instruction decoding means coupled to said instruction storage means, for decoding said operation portion of said one instruction output from said instruction storage means;

data processing means coupled to said instruction decoding means, for consecutively processing variable-length data in accordance with said decoded operation portion, the variable length data being consecutively read out by using the addresses output from said address generating means;

delimiter detecting means coupled to said instruction storage means, for outputting a coincidence signal upon detecting that a delimiter of said variable-length data which coincides with the delimiter designated by said delimiter portion of said one instruction is present in said consecutively read out variable-length data; and control means coupled to said delimiter detecting means, for ending said consecutive processing of variable-length data performed in accordance with said decoded operation portion in response to the coincidence signal from said delimiter detecting means.

* * * * *

UNITED STATES PATENT AND TRADEMARK OFFICE
CERTIFICATE OF CORRECTION

PATENT NO. : 4,975,835

DATED : December 4, 1990

INVENTOR(S) : HIDAKA et al

It is certified that error appears in the above-identified patent and that said Letters Patent is hereby corrected as shown below:

TITLE PAGE:

Item [30] Foreign Application Priority Data -
Change the Japanese applications as follows:

"62-166280" to read --62-166280[U]--.

"62-166281" to read --62-166281[U]--.

Section [56] References Cited, insert the following references as indicated below:

U.S. PATENT DOCUMENTS

| | | |
|---|---|---|
| 4,523,237 | 6/1985 | Fukuda et al.....360/8 |
| 4,539,605 | 9/1985 | Hoshino et al....360/32 |
| 4,615,024 | 9/1986 | Usui.............369/59 |
| 4,758,902 | 7/1988 | Okamoto et al....360/18 |
| 4,769,722 | 9/1988 | Itoh et al.......360/27 |
| 4,772,959 | 9/1988 | Amano et al......360/8 |

FOREIGN PATENT DOCUMENTS

| | | |
|---|---|---|
| 53-46689 | 12/1978 | Japan |
| 57-51137 | 10/1982 | Japan |
| 57-56093 | 11/1982 | Japan |
| 58-46735 | 10/1983 | Japan |
| 58-53384 | 11/1983 | Japan |

UNITED STATES PATENT AND TRADEMARK OFFICE
CERTIFICATE OF CORRECTION

PATENT NO. : 4,975,835

DATED : December 4, 1990

INVENTOR(S) : HIDAKA et al

It is certified that error appears in the above-identified patent and that said Letters Patent is hereby corrected as shown below:

OTHER DOCUMENTS

IBM TECHNICAL DISCLOSURE BULLETIN, VOL.10, NO.9
February, 1968 "CHARACTER SCANNING INSTRUCTION".

Signed and Sealed this

Twentieth Day of July, 1993

Attest:

MICHAEL K. KIRK

*Attesting Officer*    Acting Commissioner of Patents and Trademarks

UNITED STATES PATENT AND TRADEMARK OFFICE
CERTIFICATE OF CORRECTION

PATENT NO. : 4,975,835
DATED : December 4, 1990
INVENTOR(S) : N. HIDAKA et al

It is certified that error appears in the above-indentified patent and that said Letters Patent is hereby corrected as shown below:

TITLE PAGE:

Item [30] Foreign Application Priority Data -
Change the Japanese applications as follows:

"62-166280" to read --62-166280[U]--.
"62-166281" to read --62-166281[U]--.

Item [56] References Cited, insert the following references as indicated below:

<u>FOREIGN PATENT DOCUMENTS</u>

| | | |
|---|---|---|
| 53-46689 | 12/1978 | Japan |
| 57-51137 | 10/1982 | Japan |
| 57-56093 | 11/1982 | Japan |
| 58-46735 | 10/1983 | Japan |
| 58-53384 | 11/1983 | Japan |

UNITED STATES PATENT AND TRADEMARK OFFICE
CERTIFICATE OF CORRECTION

PATENT NO.  : 4,975,835
DATED       : December 4, 1990
INVENTOR(S) : N. HIDAKA et al It is certified that error appears in the above-indentified patent and that said Letters Patent is hereby corrected as shown below:

OTHER DOCUMENTS

IBM TECHNICAL DISCLOSURE BULLETIN, VOL.10, NO.9
February, 1968 "CHARACTER SCANNING INSTRUCTION".

This Certificate supersedes Certificate of Correction issued July 20, 1993.

Signed and Sealed this

Fourteenth Day of December, 1993

Attest:

BRUCE LEHMAN

*Attesting Officer*          *Commissioner of Patents and Trademarks*